Patented June 10, 1924.

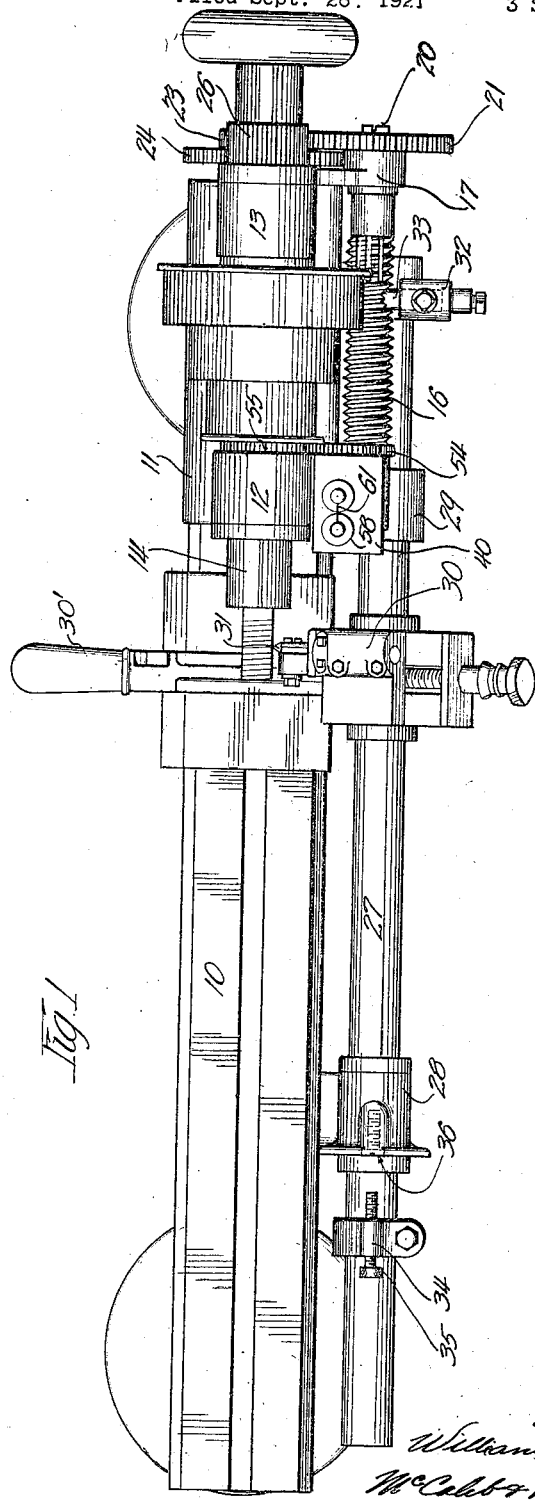

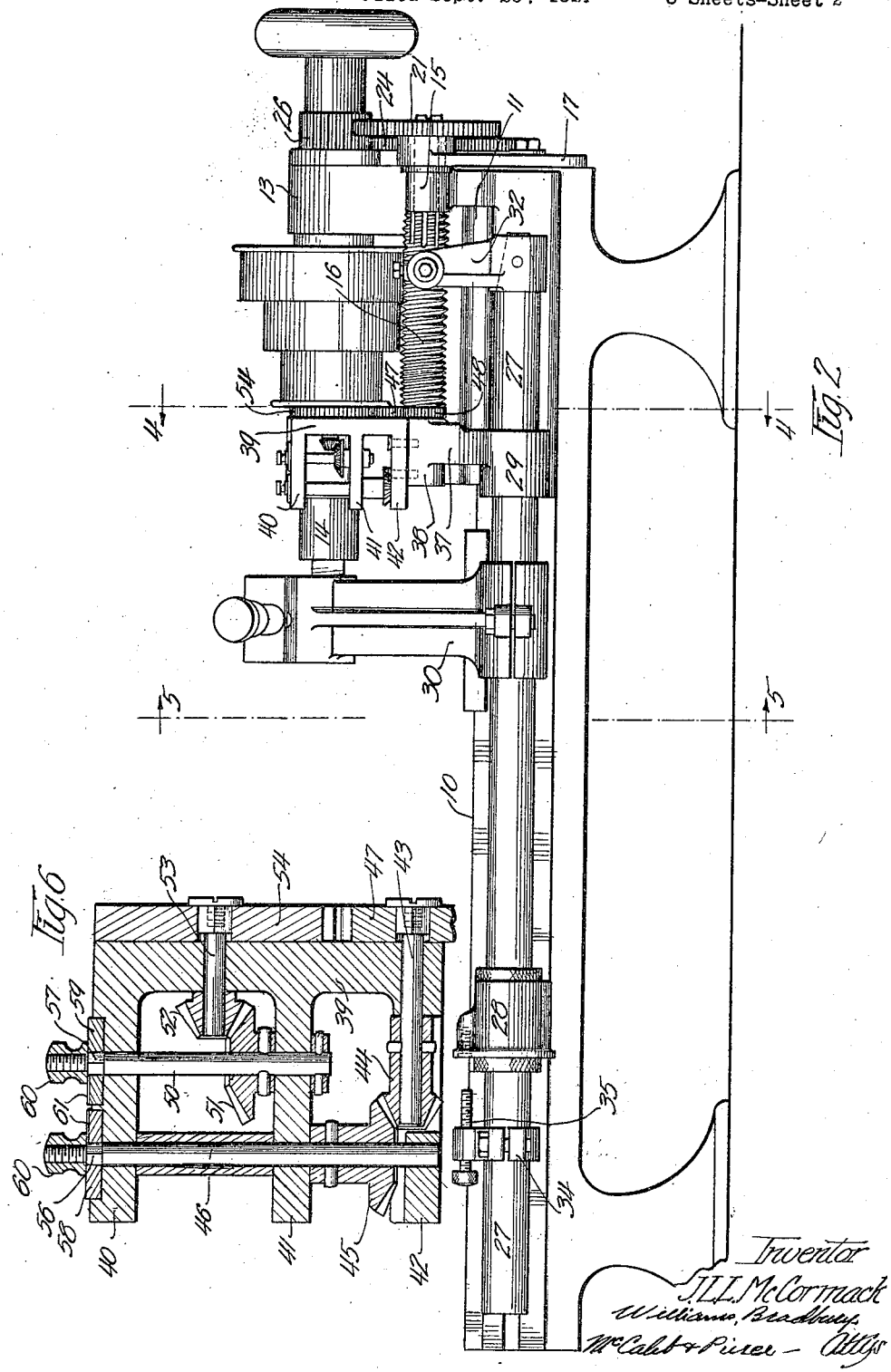

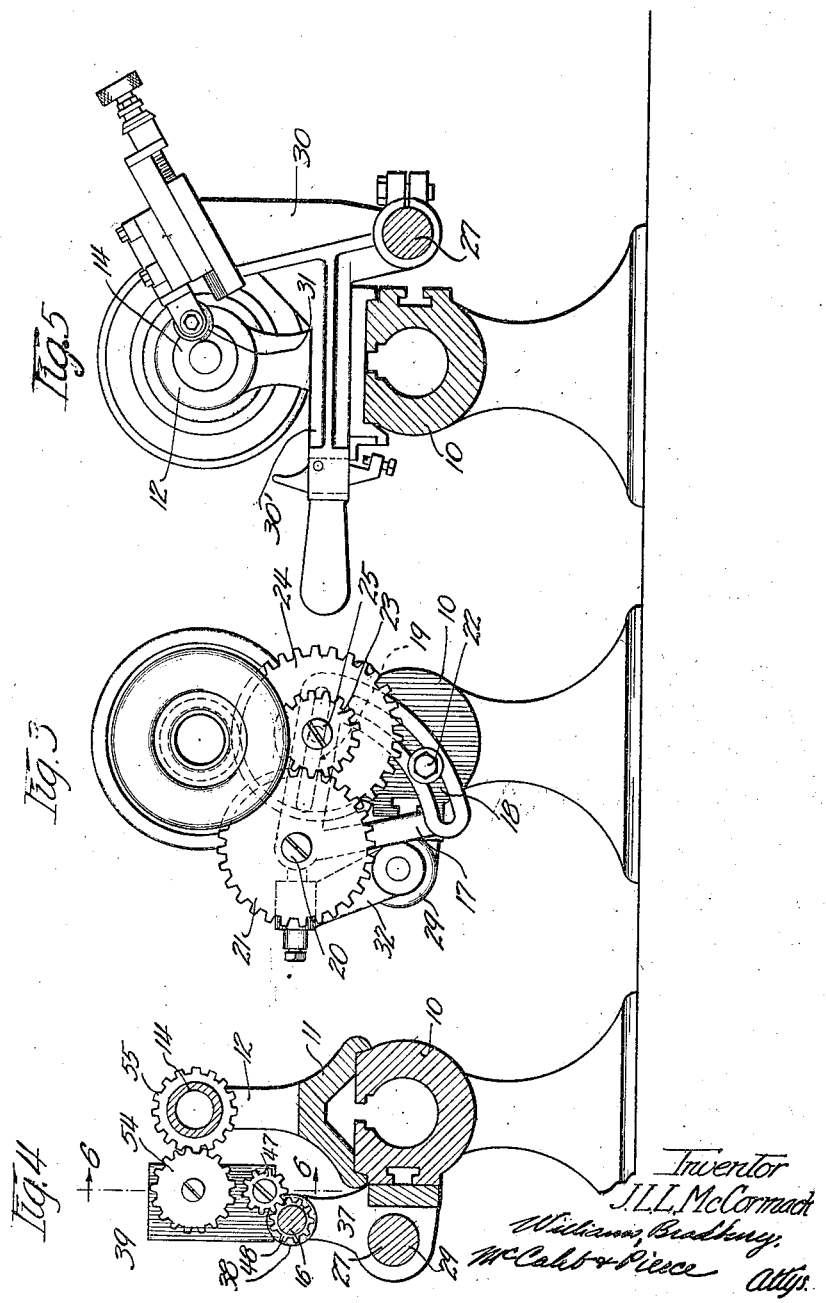

1,497,109

UNITED STATES PATENT OFFICE.

JAMES L. L. McCORMACK, OF CHICAGO, ILLINOIS, ASSIGNOR TO HARDINGE BROS. INC., OF CHICAGO, ILLINOIS, A CORPORATION OF ILLINOIS.

SCREW-THREAD-CUTTING MACHINE.

Application filed September 26, 1921. Serial No. 503,366.

*To all whom it may concern:*

Be it known that I, JAMES L. L. McCORMACK, a citizen of the United States, and a resident of Chicago, in the county of Cook and State of Illinois, have invented a certain new and useful Improvement in Screw-Thread-Cutting Machines, of which the following is a full, clear, concise, and exact description, reference being had to the ac companying drawings, forming a part of this specification.

My invention relates to improvements in screw thread cutting machines, and is particularly concerned with, but not limited to, improvements in the lathe type of screw thread cutting machine.

The objects of my invention are:

First: To provide a screw thread cutting machine in which a hob or master tap is provided for moving the cutting tool relatively to the work, the cutting tool being driven through a mutilated nut having a detachable engagement with the hob, the arrangement being such that a single hob can be used for cutting threads of any desired pitch;

Second: To provide a machine of the character described in which means are provided for indicating to the operator when the beginning of the thread on the hob is in registry with the beginning of the partially formed thread on the work, and Third: To provide means of the character described which are simple in construction and operation.

Other objects will appear as this description progresses, reference being had to the accompanying drawings in which I have conventionally illustrated my invention in combination with a screw thread chasing machine, and in which—

Figure 1 is a plan view of a chasing machine embodying my invention;

Figure 2 is a side elevation thereof;
Figure 3 is an end elevation;

Figures 4 and 5 are transverse sections taken on lines 4—4 and 5—5 respectively of Figure 2, and Figure 6 is a vertical section through my improved indicating machines taken substantially on line 6—6 of Figure 4.

Throughout the several views, similar reference characters are used for referring to similar parts, and the sections are taken looking in the direction of the small arrows.

The chasing machine which I have conventionally illustrated in the accompanying drawings comprises a bed plate 10 at one end of which is mounted the head stock 11 comprising the two bearings 12 and 13 for the live spindle 14, and a bearing 15 for the hob or master tap 16.

A bracket 17 having the arcuate slot 18 and a radially extending slot 19 is secured to the head stock end of the bed plate by means of the screw 20 upon which the bracket 17 is pivotally mounted, and which connects the gear 21 with the hob in driving relation, and the screw 22 which engages the sides of the slot 18 to hold the bracket 17 in its adjusted position. A pinion 23 meshes with the gear 21, and is secured in driving relation to the gear 24 by means of the screw 25 which extends through the slot 19. The gear 24 meshes with a pinion 26 carried by the outer end of the shaft of the live spindle. By substituting other gears and pinions for the gears 21 and 24 and the pinion 23, the hob 16 can be driven at any desired speed relative to the live spindle.

A shaft 27 is slidably mounted in bearings 28 and 29 projecting from one side of the bed plate 10, and is slidably mounted in these bearings so that it can be moved in a direction parallel with the axis of the live spindle 14. A carriage 30 is mounted upon the shaft 27 for carrying a cutting tool 31. The shaft 27 and the carriage 30 carried by it can be tilted by the operator by means of the handle 30' to bring the cutting tool into engagement with, or out of engagement with, the work, as desired. The bracket 32 is secured to one end of the shaft 27 and carries a mutilated nut 33 which is brought into and out of engagement with the hob 16 by the rocking of the shaft 27. A dog 34 is carried by the opposite end of the shaft 27 and carries an adjustable set screw 35, one end of which contacts with the end of the set screw 36 to determine the extreme right hand position of the cutting tool, or, in other words, to determine the beginning of the thread.

The construction thus far described is purely conventional and forms no part of my invention except as it co-acts with the means about to be described. Secured to the bracket 37 which forms the bearing 29 for the shaft 27, and the bearing 38 for one end of the hob 16 is a bracket comprising the vertical member 39 and the three lateral extensions 40, 41 and 42. A shaft 43 is mounted in the vertical member 39 and at its inner end carries a bevel pinion 44 which meshes with the bevel gear 45 carried by the shaft 46 which has bearing in each of the lateral projections 40, 41 and 42. The outer end of the shaft 43 carries a gear 47 which meshes with a gear 48 carried by the hob 16.

A second shaft 50 is journaled in the lateral extensions 40, and 41, and is driven through the bevel gear 51, the bevel pinion 52 and the shaft 53, to the inner end of which the pinion 52 is secured. A spur gear 54 is secured to the outer end of shaft 53 and meshes with a spur gear 55 carried by the live spindle 14.

The driving connection between the hob 16 and the shaft 46 is such that the shaft 46 rotates at the same speed as the hob 16, and in a similar manner the driving connection between the shaft 50 and the live spindle 14 is such that they both rotate at the same speed.

The upper ends of the shafts 46 and 50 are polygonal in cross-section, as shown at 56 and 57 respectively, and each respectively carries the disks 58 and 59. These disks are held in place by suitable nuts 60. The disks 58 and 59 each have a radial index line 61 engraved in their outer faces.

With prior constructions, it has been found impracticable to use the same hob for cutting threads of different pitches except for cutting those threads which form a multiple of the hob pitch. This is because it was impossible after the initial cut forming a thread had been made to bring the tool back to the beginning of the thread and bring it into engagement with the thread at the proper instant.

When a thread cutting machine is provided with my improved indicating means, described above, the set screw 35 is adjusted to determine the beginning of the thread, and the operator then brings the cutting tool into engagement with the work at the instant the two index lines 61 of the disks 58 and 59 come into registry with each other. After the first cut has been made, the tool is returned to the position determined by the set screw 35. The operator then waits until the two index lines 61 again register with each other, and at that instant again brings the cutting tool into engagement with the work. It will be quite clear from the above description that it is immaterial what gear ratio is used between the live spindle and the hob, because, after a predetermined number of revolutions determined by the gear ratio between these two members, the beginning of the partially formed thread and the part of the hob initially engaged by the mutilated nut 33 will occupy the same relative positions that they did initially and that this will be indicated by the registration of the two lines 61. This registration will take place periodically, and the movement of the two disks 58 and 59 is, for ordinary threads, sufficiently slow to make it possible for the operator to determine slightly in advance when the two lines are to come into registry with each other so that he will have no difficulty in engaging the cutting tool with the thread at the proper instant.

From the above description it has been pointed out that the shafts 46 and 50 rotate at the same speed as the hob and live spindle, respectively, but it will, of course, be understood that where these speeds are excessive a reduction gearing may be used between the shafts referred to and the hob and live spindle as long as the speeds of the two shafts 46 and 50 are correspondingly reduced. In such a construction the index lines will not indicate every time the threads on the hob and the work are in registry, but only every second or third time, and so forth, depending upon the gear ratio between the two shafts and the live spindle and hob, respectively.

While I have described the details of construction of the preferred embodiment of my invention, and while I have described it in connection with a thread cutting machine of a particular type, it is to be clearly understood that my invention is not limited to these details nor this adaptation, but is capable of other adapatations and modifications within the scope of the appended claims.

Having thus described my invention, what I claim is:

1. The combination with a screw thread cutting machine comprising a live spindle, a hob, a shaft mounted in a bearing and slidable in a direction parallel to the axis of said live spindle, a cutting tool carried by said shaft, and a follower carried by said shaft for engagement with said hob, of means for indicating when said cutting tool should be brought into engagement with the work comprising two disks mounted side by side and each bearing a radial index line, means for driving one of said disks in synchronism with said live spindle, and means for driving the other of said disks in synchronism with said hob.

2. The combination with a screw thread cutting machine comprising a live spindle, a hob, a shaft mounted in a bearing and slidable in a direction parallel to the axis of said live spindle, a cutting tool carried by said shaft, and a follower carried by said shaft for engagement with said hob, of means for indicating when said cutting tool should be brought into engagement with the work comprising two disks each bearing an index line, means for driving one of said disks in synchronism with said live spindle, and means for driving the other of said disks in synchronism with said hob.

3. The combination with a screw thread cutting machine comprising a live spindle, a hob, a shaft mounted in a bearing and slidable in a direction parallel to the axis of said live spindle, a cutting tool carried by said shaft, and a follower carried by said shaft for engagement with said hob, of means for indicating when said cutting tool should be brought into engagement with the work comprising two disks each bearing an index line, and means for driving one of said disks from said live spindle, and the other of said disks from said hob.

4. The combination with a thread cutting machine comprising a live spindle, a hob, and a cutting tool moved by said hob relatively to said live spindle, of means for indicating when said live spindle and said hob occupy a predetermined position relative to each other, the said means comprising one member driven from said live spindle, and a second member driven from said hob, and means for indicating when said driven members occupy a predetermined position relative to each other.

In witness whereof, I hereunto subscribe my name this 22nd day of September, 1921.

JAMES L. L. McCORMACK.

Witnesses:
 EARL F. PIERCE,
 M. ORAM.